Feb. 26, 1957 J. A. CANTER 2,783,083
COMBINATION VALVE, WATER PRESSURE REGULATOR AND BUBBLER
Filed Nov. 3, 1953
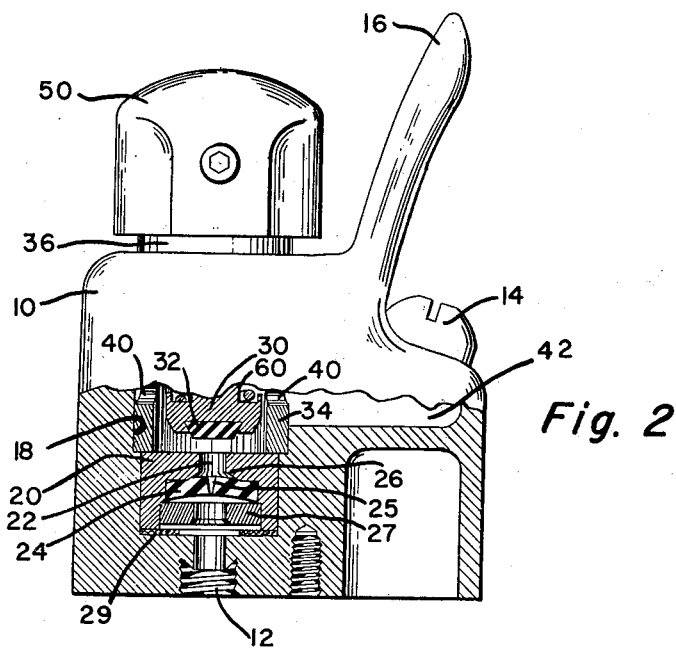
Fig. 2
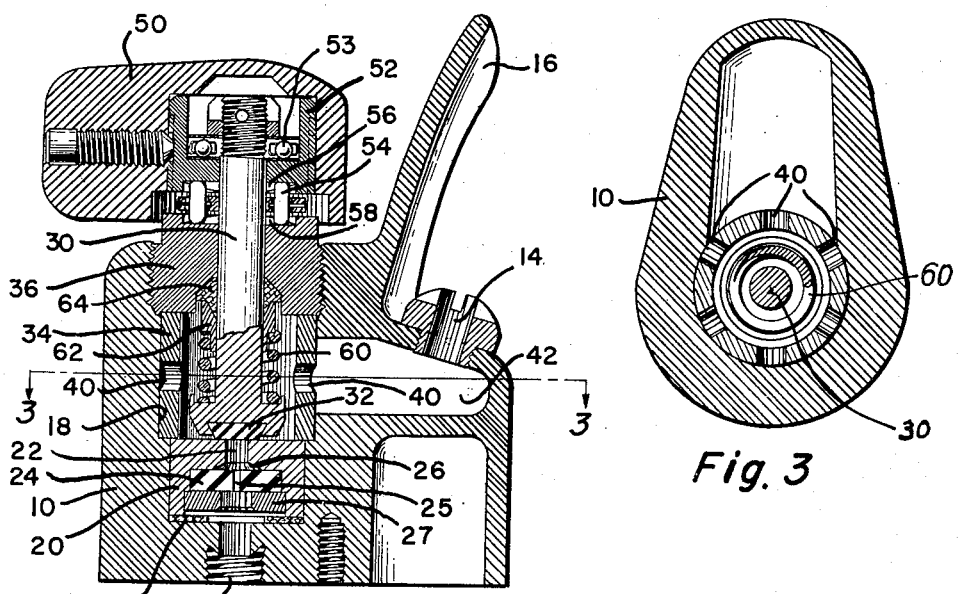
Fig. 3
Fig. 1
INVENTOR.
James A. Canter.
BY R. R. Candor.
His Attorney.

United States Patent Office 2,783,083
Patented Feb. 26, 1957

2,783,083

COMBINATION VALVE, WATER PRESSURE REGULATOR AND BUBBLER

James A. Canter, Dayton, Ohio, assignor to General Motors Corporation, Detroit, Mich., a corporation of Delaware Application November 3, 1953, Serial No. 390,052

3 Claims. (Cl. 299—16)

This invention relates to refrigerating apparatus and more particularly to a combination valve and water pressure regulator for controlling the flow of refrigerated water in a drinking fountain.

It is an object of this invention to provide a combination valve, pressure regulator and bubbler having a minimum number of parts.

Another object of this invention is to both simplify and improve the construction and arrangement of parts in a flow control device for drinking fountains and the like.

Further objects and advantages of the present invention will be apparent from the following description, reference being had to the accompanying drawings, wherein a preferred form of the present invention is clearly shown.

In the drawings:

Figure 1 is a vertical sectional view showing the relation between the pressure regulator, control valve, and bubbler;

Figure 2 is an elevational view with parts broken away showing the valve in the open position; and, Figure 3 is a sectional view taken substantially on line 3—3 of Figure 1.

Referring now to the drawing wherein a preferred embodiment of the invention has been shown, reference numeral 10 designates a main casting having a water inlet passage 12 provided in the bottom thereof and a water outlet passage 14 located adjacent the usual bubbler guard 16. The casting 10 is provided with a vertically extending chamber or bore 18 into which the pressure regulator assembly and valve mechanism is inserted.

The pressure regulator assembly includes a circular insert 20 having a central water passage 22 formed therein. A pressure regulating disc 24 is carried by the insert 20 and is in the form of a rubber washer having a central aperture 25 through which the water is required to pass. The insert member 20 is cut away as shown at 26 so that when the pressure of the water striking the bottom surface of the pressure regulating disc 24 exceeds a predetermined value the central portion of the disc 24 will begin to flex into the cut away portion 26 and thereby distort the shape of the central aperture 25 as shown in Figure 2. As the water pressure increases the distortion increases and this increase in distortion causes a corresponding restriction to the flow of water with the result that a uniform flow of water will at all times be provided irrespective of water pressure changes.

The disc 24 is held in place by means of a retainer element 27 which is carried by the insert 20 as shown. A gasket 29 prevents leakage of water past the sides of the insert 20. The valve for shutting on and off the flow of water includes a reciprocating valve stem 30 which carries a rubber or rubber like sealing member 32 on its lower end which directly seals against the top surface of the insert 20.

The insert 20 is held in place by means of a sleeve 34 which in turn is held in place with the usual retaining nut 36. The sleeve 34 is provided with a plurality of apertures 40 through which the water flows into the chamber 42 on its way to the bubbler outlet passage 14. For purposes of illustrating the invention, six of these apertures are shown (see Figure 3) whereby the insert does not require accurate positioning within the main housing 10.

The usual valve operating handle 50 has been provided and this handle includes a cam element 52 which rotates with the handle 50 at all times but is freely rotatable relative to the stem 30. The ball bearing assembly 53 permits this relative rotation but prevents endwise movement of the handle assembly relative to the valve stem 30. Upon rotation of the handle 50 and the insert 52 a pair of rollers 54 ride on inclined cam surfaces 56 and 58 provided on the elements 52 and 36 respectively so as to cause lifting of the valve stem 30. This roller and cam arrangement is well known in valve operating mechanism and needs no further description.

Spring means 60 biases the valve stem 30 into the valve closing position and also serves to bias the packing gland sleeve 62 upwardly into engagement with packing 64 which surrounds the valve stem 30.

By virtue of the above described construction and arrangement it is obvious that a minimum number of parts are required and that the parts may be produced by mass production methods and quickly assembled without any danger of misalignment or the like. The simple assembly shown functions in an improved manner to accurately control both the pressure of the water as well as the quantity of the water discharged by the bubbler.

While the form of embodiment of the invention as herein disclosed constitutes a preferred form, it is to be understood that other forms might be adopted, as may come within the scope of the claims which follow.

What is claimed is as follows:

1. A combination pressure regulator, valve and bubbler for drinking fountains comprising a one piece cast outer housing formed with a water receiving inlet; a circular chamber in said housing communicating with said water inlet; a pressure regulating assembly disposed within said chamber; said pressure regulating assembly comprising a circular insert having a water passage formed therein and a resilient pressure regulating means disposed adjacent said water passage and distortable in response to changes in incoming water pressure for regulating the flow of water through said water passage; and a valve assembly mounted within said circular chamber; said valve assembly including a valve stem and a resilient sealing element arranged to directly engage the upper surface of said pressure regulating assembly adjacent the outlet of said water passage so as to control the flow of water through said passage; said housing having a bubbler outlet for discharging a stream or jet of water from said body; said valve assembly including packing gland means for said valve stem threadably inserted within the upper end of said chamber for holding said valve assembly and said pressure regulating assembly in place relative to said housing; said packing gland means including a nut and a spacer element between said nut and said pressure regulating assembly.

2. A combination pressure regulator, valve and bubbler for drinking fountains comprising a one piece cast outer housing formed with a water receiving inlet; a circular chamber in said housing communicating with said water inlet; a pressure regulating assembly disposed within said chamber; said pressure regulating assembly comprising a circular insert having a water passage formed therein and a resilient pressure regulating means disposed adjacent said water passage and distortable in response to changes in incoming water pressure for regulating the flow of water through said water passage; and a valve assembly mounted within said circular chamber; said valve assembly including a valve stem and a resilient sealing element arranged to directly engage the upper surface of said pressure regulating assembly adjacent the outlet of said water passage so as to control the flow of water through said passage; said housing having a bubbler outlet for discharging a stream or jet of water from said body; said valve assembly including packing gland means for said valve stem threadably inserted within the upper end of said chamber for holding said valve assembly and said pressure regulating assembly in place relative to said housing; said packing gland means including a nut and a spacer element between said nut and said pressure regulating assembly; said spacer element comprising a tubular sleeve surrounding said valve stem and having radial apertures through which the water flows to said bubbler outlet.

3. A combination pressure regulator, valve and bubbler for drinking fountains comprising a one piece outer housing formed with a water receiving inlet; a circular chamber in said housing communicating with said water inlet and having a diameter greater than the the diameter of said water inlet whereby a ledge is formed in said housing adjacent said inlet; a pressure regulating assembly disposed within said chamber and resting on said ledge; said pressure regulating assembly comprising a circular insert having a water passage formed therein and a resilient pressure regulating means disposed adjacent said water passage and distortable in response to changes in incoming water pressure for regulating the flow of water through said water passage; and a valve assembly mounted within said circular chamber and serving to hold said pressure regulating assembly against said ledge; said valve assembly including a valve stem and a resilient sealing element arranged to directly engage the upper surface of said pressure regulating assembly adjacent the outlet of said water passage so as to control the flow of water through said passage.

References Cited in the file of this patent
UNITED STATES PATENTS

| | | |
|---|---|---|
| 2,489,542 | Rosenblum | Nov. 29, 1949 |
| 2,572,244 | Chace | Oct. 23, 1951 |
| 2,585,845 | Rosenblum | Feb. 12, 1952 |
| 2,645,885 | Benua | July 21, 1953 |